United States Patent [19]
Schmidt

[11] 3,870,889
[45] Mar. 11, 1975

[54] FILM SHEET CASSETTE

[75] Inventor: Gunter Schmidt, Malibu, Calif.

[73] Assignee: Production, Inc., Los Angeles, Calif.

[22] Filed: Dec. 26, 1973

[21] Appl. No.: 428,618

[52] U.S. Cl. .............................. 250/480, 250/482
[51] Int. Cl. ........................................ G01n 21/34
[58] Field of Search .......... 250/469, 471, 475, 478, 250/479, 480, 481, 482, 521, 477

[56] References Cited
UNITED STATES PATENTS

| | | | |
|---|---|---|---|
| 3,174,039 | 3/1965 | Frede | 250/480 |
| 3,240,936 | 3/1966 | Masi | 250/480 |
| 3,504,180 | 3/1970 | Tone | 250/480 |
| 3,784,835 | 1/1974 | Schmidt | 250/480 |

*Primary Examiner*—Archie R. Borchelt
*Assistant Examiner*—D. C. Nelms
*Attorney, Agent, or Firm*—Lindenberg, Freilich, Wasserman, Rosen & Fernandez

[57] ABSTRACT

A film sheet cassette useful in medical X-ray applications and particularly in daylight film handling systems which include a dispenser for dispensing film sheets one at a time into the cassette. In use, the loaded cassette is first exposed to an X-ray source to photograph a patient after which it may be positioned in operative relationship with respect to a film processor for releasing the exposed film sheet into the processor. The cassette is comprised of a housing including a back plate and a dover plate fixed thereto in parallel spaced relationship. The back plate is provided with a raised elongated rib in the center thereof and strips of compressible material affixed to the back plate adjacent to its side edges. Disposed between the back plate and cover plate are a flexible back screen plate adjacent to the back plate and a flexible pressure screen plate adjacent to the cover plate. The cassette housing defines channels along opposite edges thereof for receiving spring urged cam rods slidable between a first closed position and a second open position. The pressure screen plate is provided with follower studs along the edges thereof which ride on cam surfaces of the rods. Actuating pins are provided on both the dispenser and processor for protruding into the channels when the cassette is positioned in operative light tight relationship with respect thereto. The pins engage the cam rods to slide them within the channels from said first to said second position thus causing the cam surfaces to lift the follower studs and space the pressure screen plate from the back screen plate to thus allow film sheets to enter or exit from the cassette. Withdrawal of the pins permits the cam rods to return to the first position thus forcing the studs toward the back plate and bowing both screen plates about the back plate rib to thereby assure excellent film/screen contact.

10 Claims, 9 Drawing Figures

PATENTED MAR 11 1975  3,870,889

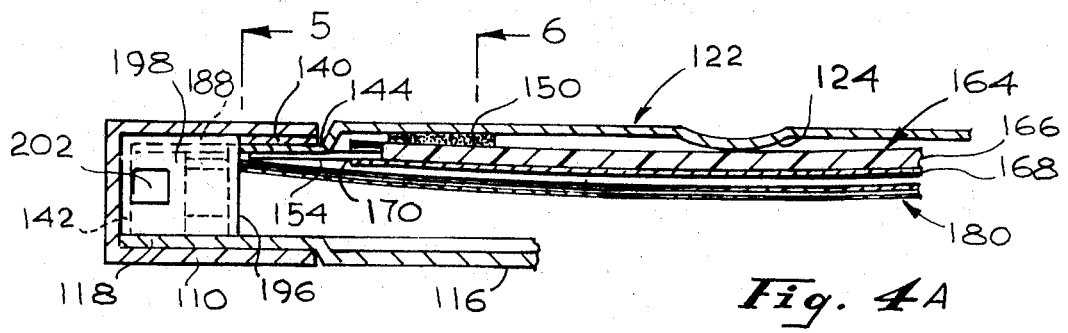
Fig. 4A
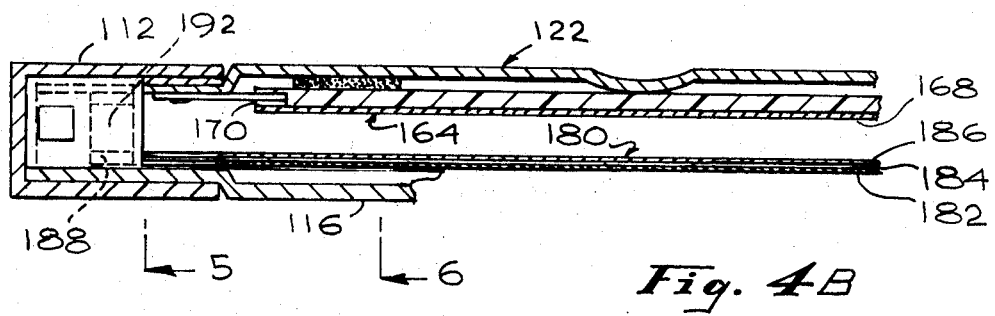
Fig. 4B
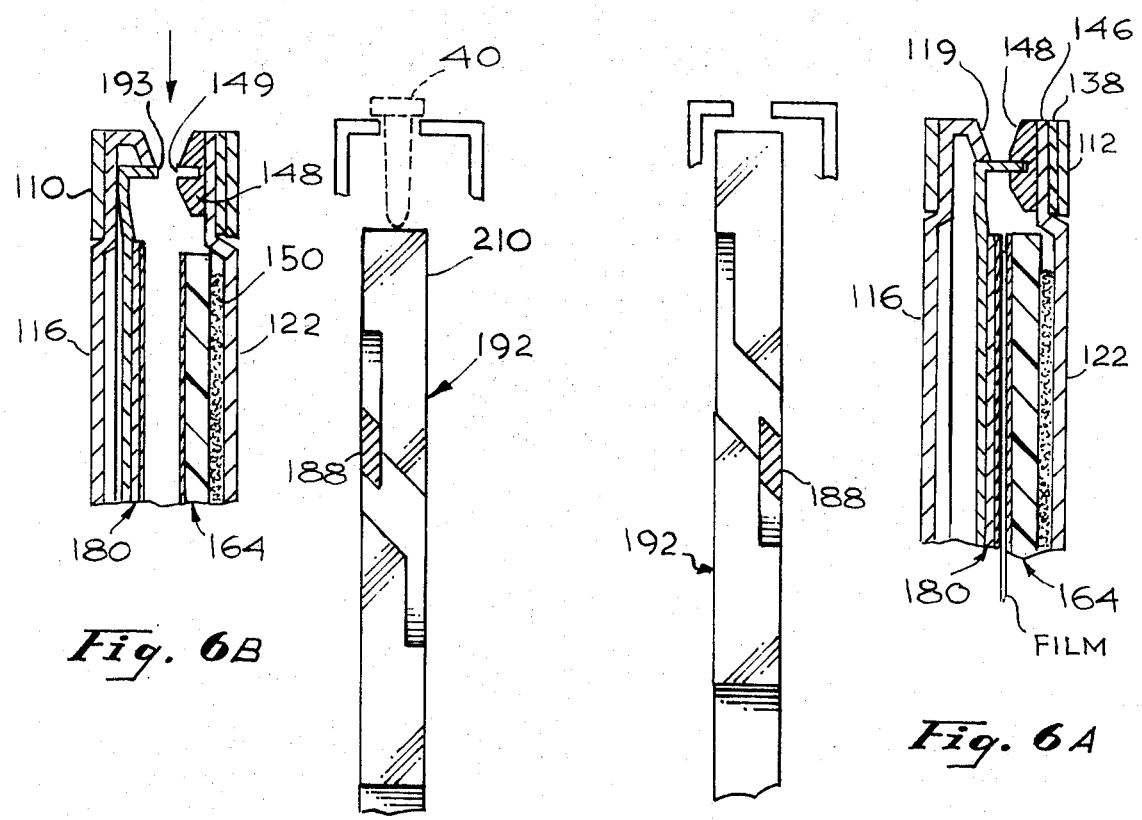
Fig. 6B
Fig. 5B
Fig. 5A
Fig. 6A

FILM SHEET CASSETTE

BACKGROUND OF THE INVENTION

This invention relates generally to film handling systems and, more particularly, to X-ray film sheet cassettes for facilitating the daylight handling of X-ray film sheets of the type primarily used in the dental, medical and industrial fields.

In the conventional use of X-ray films, as by dental and medical technicians, an X-ray film sheet is normally loaded into a cassette in a darkroom, exposed with the patient, and then again taken into the darkroom for removal from the cassette for processing. The necessity of darkroom handling of the X-ray film is inconvenient, time consuming, and costly.

U.S. patent application Ser. No. 52,848 filed July 7, 1970 discloses a film handling system which avoids the necessity of darkroom handling of X-ray film sheets. Briefly, the system disclosed in the cited application includes a film sheet dispenser for dispensing film sheets one at a time into a film sheet cassette. While in the cassette, the film sheet is exposed to photograph a patient and subsequently, the cassette is unloaded to transfer the film sheet into a processor. Transfer of the film sheet from the dispenser to the cassette to the processor is, of course, performed under light tight conditions. Embodiments of a cassette useful in such a system are disclosed in U.S. patent application Ser. No. 226,105 filed Feb. 11, 1972.

OBJECTS AND SUMMARY OF THE INVENTION

An object of the present invention is to provide a film sheet cassette suitable for use in a daylight film handling system.

More particularly, it is an object of the present invention to provide a thin cassette constructed so as to assure good and uniform film/screen contact over the entire film sheet.

Briefly, in accordance with the present invention, a film sheet cassette is provided including a pair of resilient screen plates mounted parallel to one another for limited movement toward and away from one another and toward and away from a fixed back plate. In an open position, the screen plates are relatively widely spaced to permit a film sheet to enter or exit from the cassette. In a closed position, one screen plate is forced toward the back plate sandwiching the other screen plate therebetween and bending both screen plates around a raised rib in the back plate thus applying a uniform pressure against a film sheet between the screen plates.

In accordance with one important aspect of the invention, the back screen plate is preferably comprised of low X-ray absorbing material such as Lucite having a layer of X-ray intensifying screen material adhered thereto so as to enable the intensity of the X-ray source to be minimized.

The novel features of the invention are set forth with particularity in the appended claims. The invention will be best understood from the following description when read in conjunction with the accompanying drawings.

BRIEF DESCRIPTION OF THE DRAWINGS

FIGS. 4A and 4B are enlarged sectional views taken substantially along the plane 4—4 of FIG. 3 illustrating the relationship between the back screen and pressure screen plates and the back plate when the cassette is respectively in the closed and open positions;

FIGS. 5A and 5B are sectional views taken substantially along the plane 5—5 of FIGS. 4A and 4B respectively illustrating the cassette cam rod in the normal position when the cassette is closed and the actuated position when the cassette is open; and FIGS. 6A and 6B are sectional views taken substantially along the plane 6—6 of FIGS. 4A and 4B respectively illustrating the entrance opening light shield in the cassette open position and the cassette closed position.

DESCRIPTION OF THE PREFERRED EMBODIMENTS

Figure 1:
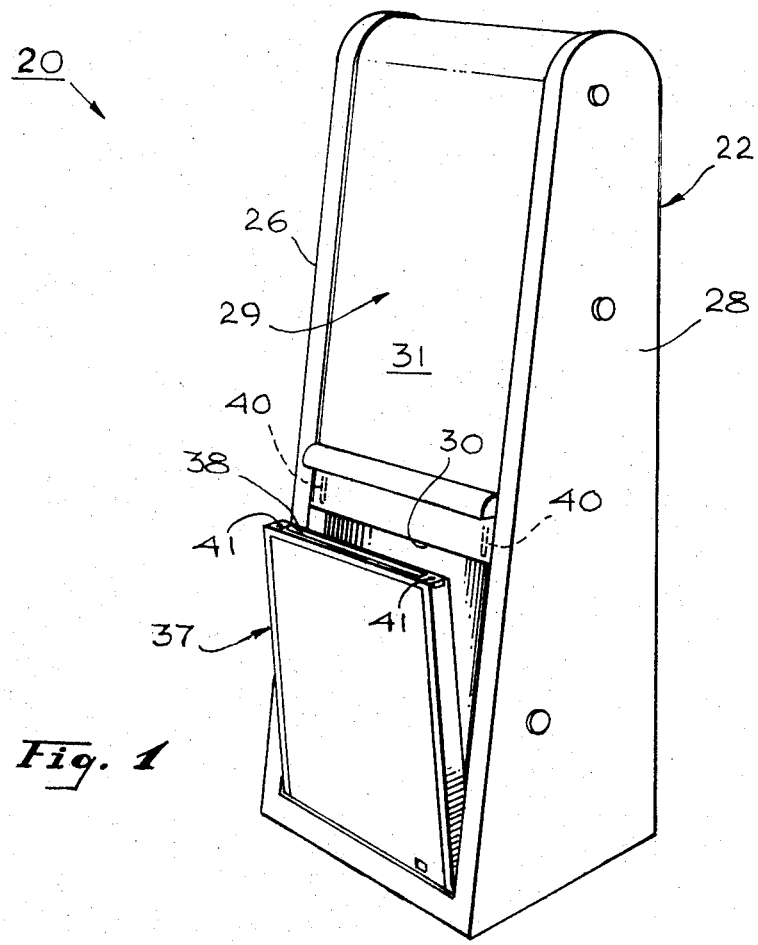
FIG. 1 is an isometric view of a film sheet dispenser apparatus useful in combination with cassette embodiments in accordance with the present invention.

Attention is now called to FIG. 1 of the drawings which illustrates a dispenser 20, which may be of the type disclosed in the aforementioned patent application Ser. No. 52,848, suitable for dispensing film sheets one at a time into a cassette constructed in accordance with the teachings of the present invention. Briefly, the dispenser 20 is comprised of a housing 22 including a back wall (not shown) and a pair of side walls 26 and 28. The back and side walls of the dispenser housing define a compartment 29 therebetween for receiving a film sheet package (not shown) from which film sheets are to be released one at a time through an exit slot 30. A slide door 31 mounted between the side walls 26 and 28 provides access to the film package compartment 29 and prevents light from seeping therein when the door is closed.

The dispenser 20 includes a tray (not shown) for receiving a film sheet cassette 37. The tray is preferably mounted on springs which can be compressed to move the tray downwardly as the cassette is inserted therein. The cassette can then be tilted forwardly to align the cassette entrance opening 38 with the dispenser exit slot 30. As the cassette is released, the springs raise the tray and cassette moving the cassette entrance opening 38 into light tight relationship with the dispenser exit slot 30 and permitting actuating pins 40 on the dispenser 20 to enter openings 41 in the cassette to open the cassette, as will be described hereinafter. A film sheet then released from the dispenser through exit slot 30 can pass through the cassette entrance opening into the cassette.

Attention is now called to FIGS. 2-6 which illustrate a film sheet cassette 37 in accordance with the present invention. The cassette of FIGS. 2-6 is constructed to assure good and uniform film sheet screen contact over the entire film sheet area and to constitute a relatively low energy absorber thereby minimizing the size of the X-ray energy source required.

Figure 2:
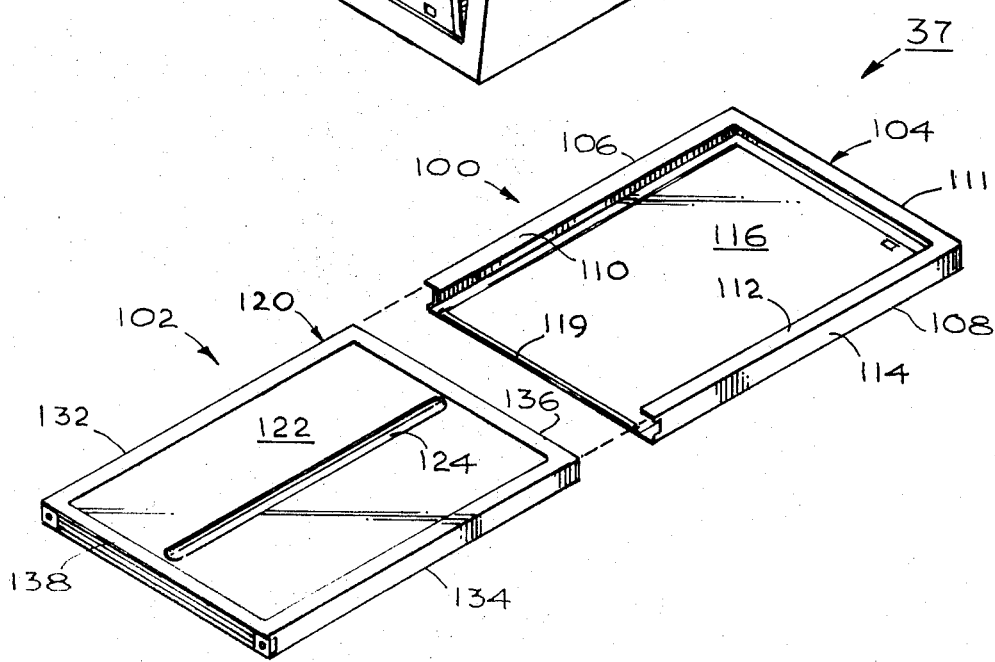
FIG. 2 is an isometric view illustrating a partially disassembled film sheet cassette in accordance with the present invention showing the back and screen plate assembly and the cover plate assembly.

The cassette 37 of FIG. 2 includes a cover plate assembly 100 and a screen and back plate assembly 102. The cover plate assembly 100 is comprised of a U-shaped frame 104 including side members 106, 108 and a bottom member 111. Each of the members 106, 108, 111 is U-shaped in cross section consisting of leg elements 110, 112 and bight element 114. A cover plate 116 formed of aluminum, for example, is secured along it's edges to the leg elements 110 of frame members 106, 108, 111. The edges 118 of the cover plate 116 are preferably bent upwardly, as is best shown in FIGS. 4A and 4B, so that the plate 116 (except for the edges 118) lies essentially in the same plane as leg elements 110. The top edge 119 of the cover plate 116 is beveled to define a guide surface for guiding film sheets entering the cassette.

The screen and back plate assembly 102, which will be described in detail hereinafter, is intended to slide into the cover plate assembly 100 with the frame 120 of assembly 102 engaging the leg and bight elements 110, 112, 114 of assembly 100 and with the back plate 122 being spaced remote from and substantially parallel to cover plate 116. The back plate 122, which is preferably formed of aluminum, is deformed to define an elongated rib 124 extending substantially along the center line thereof which, as viewed in FIG. 2, projects inwardly toward cover plate 116.

Figure 3:
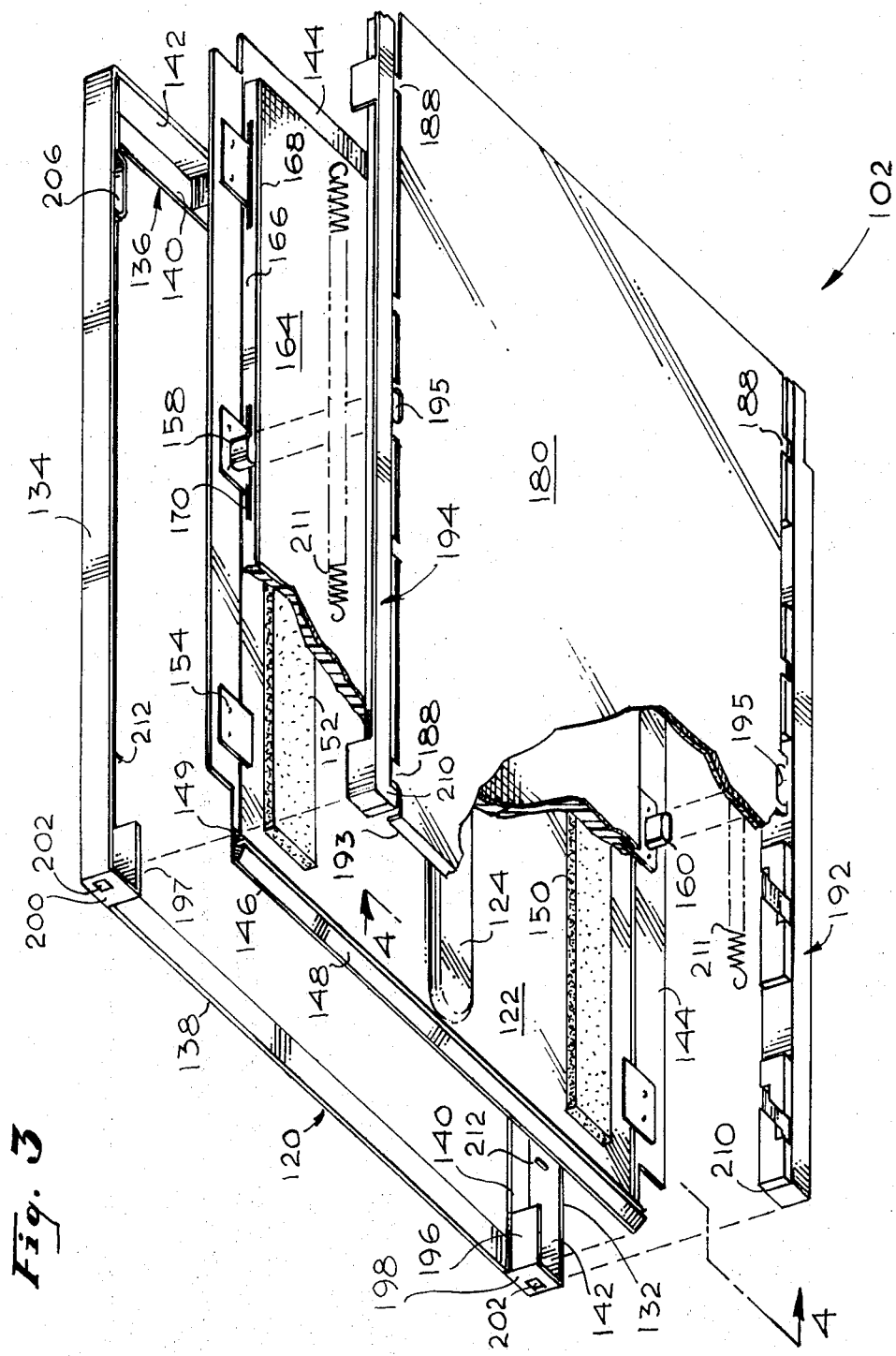
FIG. 3 is an isometric view partially broken away showing in greater detail the back and screen plate assembly of FIG. 2.

More particularly, as is best shown in FIG. 3, the back and screen plate assembly 102 is comprised of an open frame 130 including side members 132, 134, bottom member 136 and top member 138. In cross section, the members 132, 134, 136 are all L-shaped including a horizontal element 140 and a vertical element 142. The top member 138 lies in the same plane as horizontal elements 140 of members 132, 134, 136. The back plate 122 is provided with down turned edges 144 which are secured to inner surfaces of horizontal elements 140 of members 132, 134, 136 so that the remainder of the back plate 122 lies in substantially the same plane as horizontal elements 140. Thus, the back plate 122 closes the entire open window area formed by frame members 132, 134, 136, 138.

The top edge 146 of the back plate 122 bears against the frame top member 138 and carries a beveled guide member 148 providing a film guide surface for film sheets entering the cassette. The beveled member 148 cooperates with the beveled member 119 on the cover plate 116 to guide film sheets into the cassette. The guide member 148 is slotted at 149 to receive a light shield carried by pressure screen plate 180 to be described hereinafter.

As has been previously mentioned, the back plate 122 is deformed along a central line to define an elongated inwardly projecting rib 124. As is best shown in FIGS. 4A and 4B, the rib 124 is smoothly rounded in cross section and projects to a height above the major portion of the back plate central area approximately equal to the height of the downturned edges 144.

A pair of strips of compressible material 150 and 152 are secured to the back plate 122 adjacent to the side edges of the back plate. The strips 150 and 152 have a thickness approximately equal to the height of the inwardly projecting rib 124.

Tabs 154 are secured to the side edges of back plate 122 and project inwardly therefrom toward the compressible strips 150 and 152. Guide posts 158, 160 are provided on opposite side edges of back plate 122 and project toward the screen plates, to be described, and toward the cover plate 116 when the assemblies 100 and 102 are assembled together.

A back screen plate 164 is provided comprised of a flexible panel of low X-ray energy absorbing material such as Lucite 166. X-ray intensifying screen (e.g., DuPont Cronex) material 168 is adhered to one face of the Lucite panel 166. The panel 166 is provided with recessed 170 along the edges thereof which receive the tabs 154 as is best shown in FIGS. 4A and 4B. Note that the width of the recesses 170 is greater than the thickness of the tabs 154 so that the back screen plate 164 is essentially "floating"; i.e., it is somewhat free to move toward and away from the back plate 122. That is, when not being pressed toward the back plate 122, the back screen plate 164 will lie in a substantially flat plane in contact with the inwardly projecting rib 124 and the strips 150 and 152 which will not be compressed. On the other hand, when the back screen plate 164 is pressed toward the back plate 122 in the manner to be described hereinafter, the back screen plate will bow around the rib 124 compressing the strips 150 and 152.

The cassette back and screen plate assembly 102 further includes a pressure screen plate 180 which is preferably formed of a panel of light flexible material such as magnesium 182. Adhered to the inner face of the magnesium panel 182 is a layer of lead shield material 184. Adhered to the layer of lead is a layer of X-ray intensifying screen material 186 (e.g., DuPont Cronex). The pressure screen plate 180 is mounted within the assembly 102 so that the screen material thereof is opposed to the screen material 168 formed on the back screen plate 164.

Projecting from the side edges of the pressure screen plate 180 are a plurality of follower studs 188 which are adapted to engage and follow cam surfaces formed on cam rods 192 and 194. Openings 195 are formed in the pressure screen plate 180 adjacent the side edges thereof through which the guideposts 158, 160 project. The openings 195 are dimensioned relative to the guideposts so that the plate 180 can effectively ride on the guideposts in moving toward and away from the back plate 122. The front edge of the pressure screen plate 180 carries a light shield member 193 adapted to project into slot 149 in guide member 148 carried by back plate 122.

More particularly, a pair of cam rods 192 and 194 are provided for slideable movement within channels defined immediately adjacent to side members 132 and 134 of frame 120. The cam rod channels are respectively defined by the rectangular compartments formed by partitions 196, 197 affixed parallel to the frame side member vertical elements 142 immediately adjacent to the top member 138. Elements 198, 200 bridge the distance between partitions 196, 197 and the vertical elements 142 of the side member 132, 134. The bridging elements 198, 200 contain apertures 202 to permit actuating pins 40 on the dispenser (or on a processor) to project therethrough to slide the cam rods 192, 194. In addition to the rectangular compartments defined by partitions 196, 197 the cam rod channels are also formed by guides 206 which engage the cam rods for slideable movement adjacent the bottom member 136 of the frame 120.

The cam rods 192, 194 each include boxlike upper portions 210 dimensioned to fit in the rectangular compartments defined between the partitions 196, 197 and the side frame members 132, 134. Each cam rod carries a spring 211 secured to a pin 213 at its lower end and adapted to be secured to a pin 212 affixed to the frame side member 132, 134 proximate to the top frame member 138.

As noted, in order to assemble the cassette, the assembly 102 is slid into the assembly 100 thus affixing the back plate 122 in spaced parallel relationship to the cover plate 116 with the back and pressure screen plates 164 and 180 able to exhibit limited movement toward and away from one another and toward and away from the back plate 122.

When the cassette is moved into operative relationship with respect to a dispenser 20 (FIG. 1) or processor such that actuating pins 40 project through apertures 202 in the cassette, the cam rods 192, 194 will be forced downwardly, i.e., in the direction toward frame members 111, 136 as from the position represented in FIG. 5A to the position represented in FIG. 5B. As a consequence, the follower studs 195 projecting from the edges of pressure screen plate 180 will move up the cam surfaces to thus space the pressure screen plate 180 from the back screen plate 164 and open the cassette light shield means i.e. move light shield 193 out of slot 149 on guide member 148. This action permits a film sheet to be dropped into the cassette between the pressure screen plate 180 and the back screen plate 164. This open condition of the cassette is illustrated in cross section in FIG. 4B. When the actuating pins 40 are withdrawn from the apertures 202, the springs 211 will return the cam rods to the position illustrated in FIG. 5B and as a consequence the follower studs 188 will follow the cam surfaces to force the pressure screen plate 180 against the back screen plate 164. As a consequence both the pressure screen plate and back screen plate will bow around the back plate inwardly projecting rib 124 as shown in FIG. 4A. Since the back screen plate is resilient and will exhibit a tendency to flatten itself, it will assure good and substantially uniform contact over the entire film sheet area against the pressure screen plate forced downwardly by the cam rods. Moreover, since the back screen plate is preferably formed of a material such as Lucite which exhibits cold flow characteristics, it will over, a period of time, tend to flow and conform to minute curvature variations in the back pressure plate.

Although a particular embodiment of the invention has been described herein, it is recognized that variations may readily occur to those skilled in the art and consequently it is intended that the claims be interpreted to cover any such modifications and equivalents.

The embodiments of the invention in which an exclusive property or privilege is claimed is defined as follows:

1. A film sheet cassette comprising:
   a back plate and cover plate fixed in spaced substantially parallel relationship;
   raised elongated means disposed on said back plate projecting toward said cover plate;
   a resilient back screen plate disposed between said back plate and cover plate;
   a resilient pressure screen plate disposed between said back screen plate and cover plate; and
   actuatable means supported in said cassette for moving said pressure screen plate between an open first position spaced from said back screen plate and a closed second position engaging said back screen plate and deforming both said back screen plate and said pressure screen plate around said raised means.

2. The cassette of claim 1 wherein said raised elongated means is disposed substantially along a center line of said back plate; and further including
   resilient elongated pad means on said back plate extending substantially parallel to and spaced from said raised elongated means.

3. The cassette of claim 1 wherein said back plate comprises a metal panel; and wherein
   said metal panel is deformed substantially along a center line thereof to define said raised elongated means.

4. The cassette of claim 1 wherein said back screen plate comprises a flexible panel of low X-ray energy absorbing material; and further including
   a layer of X-ray intensifying screen material adhered to said flexible panel opposed to said pressure screen plate.

5. The cassette of claim 1 wherein said pressure screen plate comprises a flexible metal panel; and further including
   a layer of X-ray intensifying screen material supported on said flexible metal panel opposed to said back screen plate.

6. The cassette of claim 5 including a layer of lead interposed between said screen material and said flexible metal panel.

7. The cassette of claim 1 wherein said actuatable means includes:
   cam follower means secured to the side edges of said pressure screen plate;
   cam rod means respectively mounted adjacent said side edges of said pressure screen plate for linear movement between first and second positions;
   said cam rod means having cam surfaces engaged with said cam follower means, said cam surfaces being shaped to move said cam follower means away from said back plate to define said open first position as said cam rod means is linearly moved from said first toward said second position.

8. The cassette of claim 7 including spring means normally urging said cam rod means to said first position to cause said cam surfaces to move said cam follower means toward said back plate to define said closed second position.

9. A film sheet cassette comprising:
   a substantially rectangular frame including a back plate and a cover plate and side members interconnecting said back and cover plates in spaced parallel relationship;
   a resilient back screen plate disposed between said back plate and cover plate for limited movement toward and away from said back plate;
   a resilient pressure screen plate disposed between said back screen plate and cover plate for limited movement toward and away from said back plate;
   raised elongated means formed on said back plate and projecting toward said cover plate;
   first and second cam follower means secured to said pressure screen plate;

first and second elongated channels defined in said frame;

first and second cam rods respectively disposed in said first and second channels, for linear movement therein between first and second positions;

said first and second cam rods each having cam surface means respectively engaged with said first and second cam follower means, said cam surface means being shaped to move said cam follower means away from said back plate as said cam rods are linearly moved in said channels from said first toward said second positions;

spring means normally urging said cam rod means to said first position to move said cam follower means toward said back plate and deform both said back screen plate and said pressure screen plate around said raised elongated means;

first and second openings in said frame respectively communicating with said first and second channels for receiving pins therethrough for engaging and linearly moving said first and second cam rods;

a film sheet entrance opening defined by said frame substantially aligned with the boundary between said back screen plate and pressure screen plate; and light shield means disposed adjacent to one edge of said back plate in alignment with said film sheet entrance opening for preventing the passage of light into and between said back screen plate and pressure screen plate when said cam rods are in said first position.

10. The film sheet cassette of claim 9 wherein said light shield means includes a slotted member secured to said back plate adjacent said one edge thereof; and flange means extending substantially perpendicular from said pressure screen plate for projecting into said slotted member.

* * * * *